April 30, 1968     W. B. TARPLEY, JR     3,381,293

RADAR MARKERS

Filed Aug. 24, 1966

INVENTOR
WILLIAM B. TARPLEY, JR.

BY Seidel & Gonda

ATTORNEYS.

United States Patent Office 3,381,293
Patented Apr. 30, 1968

3,381,293
RADAR MARKERS
William B. Tarpley, Jr., West Chester, Pa., assignor to Aeroprojects Incorporated, West Chester, Pa., a corporation of Pennsylvania
Filed Aug. 24, 1966, Ser. No. 574,794
5 Claims. (Cl. 343—18)

ABSTRACT OF THE DISCLOSURE

A radar marker for free falling air deployment comprising a tab of flexible radar transparent material, a weight disposed at the bottom portion of the tab, and a plurality of radar reflective members disposed on the tab.

---

This invention relates to radar markers, and more particularly, radar markers of the type comprising an array of metallic needles.

A long felt problem has existed in connection with the use of radar marking needles. Such needles can be very but are usually made much thicker for ease of fabrication, handling, and dissemination. It has been found that by deploying a large enough number of such needles, a cloud having a radar cross section sufficient for detection by ordinary radars may be obtained. The use of such needles, however, presents serious difficulties due to their small size and light weight. Thus, dispersion of the needles results in a rapid decrease in the cross section of the marker, and accordingly, rapid fading of their radar indication. The fading problem is greatly increased when the needles are deployed in rapidly moving or turbulent air, such as is encountered in the slipstream of an aircraft or under storm conditions, and in heavy precipitation.

The present invention is a radar marker in which metallic elements corresponding to radar marker needles are disposed on backing strips. Thus, the orientation of the needles one to the other is fixed at the time of manufacture, and at least insofar as each individual strip is concerned, the radar cross section is constant. Furthermore, a preordered array of radar reflectors can be so designed as to have a considerably augmented return compared to a random array as found in a disposed cloud of needles. Moreover, the strip is designed to assume a desired orientation when deployed. Thus, in a desired embodiment of the invention, the backing strip is a flexible plastic member and a weighting material, such as a layer of metallic material, is disposed on the bottom of the strip. When such strips are released in the air, gravity acting on the weighting material causes such material to act much in the same way as the tail of a kite, thereby giving all of a series of strips a common vertical orientation.

The present invention comprehends deployment of the thin, such as on the order of 30 micro-inches in thickness novel radar marker by disseminators such as those disclosed in copending application Ser. No. 572,473, filed Aug. 15, 1966 assigned to the assignee of the present invention. Other disseminators could also be used.

Accordingly, it is an object of the present invention to provide a novel radar marker.

It is another object of the present invention to provide a novel radar marker wherein marker needles are permanently oriented with respect to each other.

It is still another object of the present invention to provide a radar marker having a longer lasting indication than needle markers heretofore known.

It is still another object of the present invention to provide a radar marker which can be rapidly and easily deployed.

Other objects will appear hereinafter.

For the purpose of illustrating the invention there is shown in the drawings a form which is presently preferred; it being understood, however, that this invention is not limited to the precise arrangements and instrumentalities shown.

Figure 1:
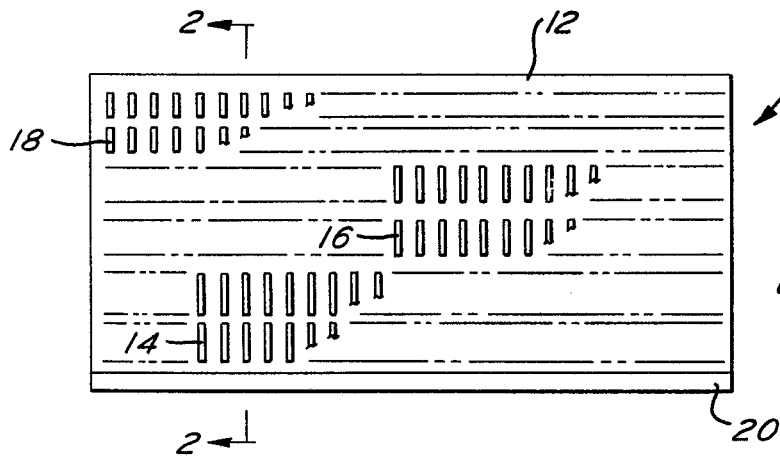
FIGURE 1 is an elevation view of a radar marker in accordance with the present invention.

Referring to the drawings in detail wherein like numerals indicate like elements, there is seen in FIGURE 1 a radar marker element designated generally by the reference number 10. The element 10 comprises a backing strip 12 and a series of needles 14, 16 and 18 thereon. Backing strip 12 is ideally made of flexible radar transparent plastic material. The polyethylene terephthalate film sold by E. I. du Pont de Nemours & Co., Inc. under the trademark "Mylar" is especially suitable. The present invention comprehends a backing strip of approximately one-half mil thickness, and approximately two inches square. It has been found that such a backing strip provides ample area for the disposition of an effective array of marker needles, yet is small enough and flexible enough to be easily ejected from disseminators.

The needles 14, 16 and 18 are disposed in rows across the face of the backing strip 12. The effectiveness of such needles as radar reflectors is determined at least in part by their length and the length of the incident radar wave. For example, in X band radar, whose wave length is 5.8 to 2.7 centimeters, the best needle length would be from 2.9 to 1.4 centimeters. Also, the effectiveness of the needles as reflectors is determined in part by their spacing one to the other. Such spacing should be on the order of one wave length (of the signal to be reflected) apart or less. It is also important that the needles be perfectly aligned.

Figure 2:
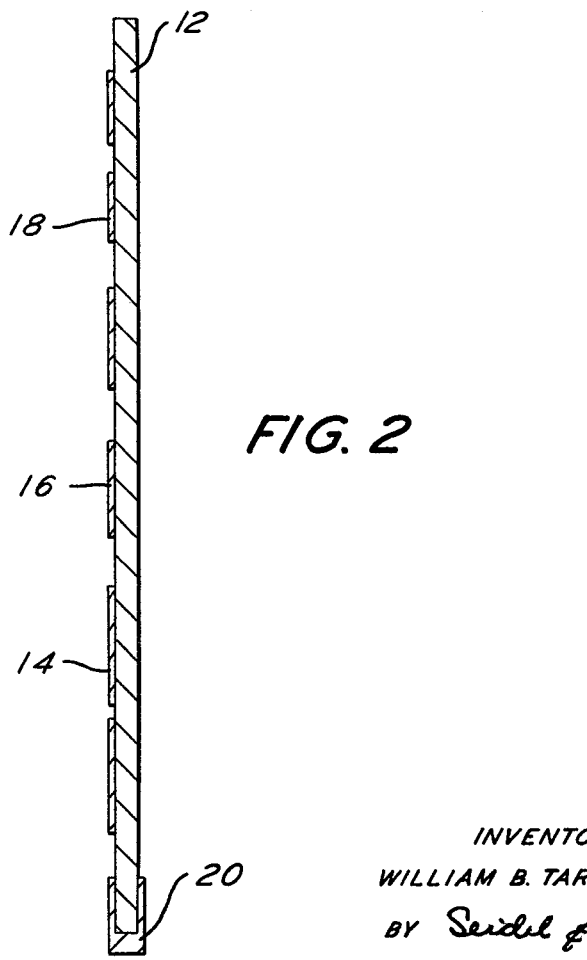
FIGURE 2 is an enlarged cross-sectional view taken along the line 2—2 in FIGURE 1.

Referring to FIGURES 1 and 2, it is evident that needles 14, 16 and 18 are of different dimensions, and are differently spaced. Thus, the illustrated radar marker is a composite marker, capable of serving as an effective reflector for radar waves of three carrier frequencies. For example, in usage, the needles 14 may be of such length as to optimize their reflections of X band signals, the needles 16 may be adapted for K band reflection, and the needles 18 for Q band. It will be appreciated, therefore, a radar marker in accordance with the present invention may be tailored so that its reflective properties are best suited to its intended usage. Thus, a marker intended for use in a survival pack carried by aircraft on over water flights would ideally have needle arrays corresponding to common types of marine and airborne radar. Referring again to FIGURE 1, it has been found that the spacing between the ends of the needles of adjacent rows, for example, the spacing between the end of the needles 14, and 16, is not critical. Thus, such spacing need only be so much that there is a non-conductive gap.

In one form of the invention, it is contemplated that the needles be aluminum, which may be deposited on the backing strip 12 by metalizing apparatus such as is disclosed in the U.S. Patents 2,622,041 and 2,665,224. Other metals, of course, could be used. When so applied, the needles are merely metalized portions of the strip, and in no way impede folding or rolling of the strip for packing in a disseminator.

Referring again to FIGURES 1 and 2, the invention further comprehends the use of a weight 20 secured to a bottom portion of the backing strip 12. Such weight serves much the same function as the tail of a kite, and serves to stabilize the strip in a vertical orientation when it is deployed in the atmosphere. Such an orientation is effective to maximize the target presented by the needles. A suitable weight 20 comprises a band of relatively heavy material, such as ferric oxide, applied to the backing strip 12 by the techniques set forth in the above U.S. patents. It should be understood, however, that the weight 20 may comprise other materials, and may be applied in any desired manner. The weight 20 is not intended to substantially affect the radar reflective properties of the radar marker.

In usage a large number of radar marker elements 10 may be disseminated from apparatus such as that of the above-identified co-pending application, or projected by other well-known means. The elements 10, due to the effect of the weight 20, assume a vertical disposition as they fall. Such disposition serves to maximize the effectiveness of the marker. Also, as explained heretofore, the fixed orientation of the needles with respect to the backing strip minimizes the effect of dispersion due to wind and atmospheric conditions. The overall result is a marker far more effective for its intended purpose than those previously known.

The present invention may be embodied in other specific forms without departing from the spirit or essential attributes thereof and, accordingly, reference should be made to the appended claims, rather than to the foregoing specification as indicating the scope of the invention.

I claim:

1. A radar marker for free falling air deployment comprising a tab formed of a flexible radar transparent backing tab, a weight disposed on a bottom portion of said tab to cause said tab to assume a generally vertical orientation when said tab is permitted to fall through the atmosphere, a plurality of conductors disposed on said strip, said conductors being generally parallel elongated needles arranged in a plurality of spaced parallel rows, the needles of each row being of equal lengths and the respective rows having needles of different lengths, the needles of the respective rows being spaced apart by different distances equal to or less than one wave length of a radar signal to be reflected from said row, and the lengths of said needles of each row being determined by the wave length of the signal to be reflected from said row so that said radar marker is adapted to reflect signals of different wave lengths.

2. A radar marker in accordance with claim 1 wherein said backing strip has a thickness in the range of .00025 to .0005 inch.

3. A radar marker in accordance with claim 1 wherein said weight comprises a layer of material overlying said backing strip.

4. A radar marker in accordance with claim 1 wherein said needles are metallic films overlying the surface of said strip, said films having a thickness of up to 30 micro-inches.

5. A radar marker in accordance with claim 4 wherein said thickness is about 30 micro-inches.

References Cited

UNITED STATES PATENTS

| 2,758,203 | 8/1956 | Harris. | |
|---|---|---|---|
| 2,840,819 | 6/1958 | McClellan. | |
| 2,881,425 | 4/1959 | Gregory | 343—18 |
| 3,122,743 | 2/1964 | Vlasic | 343—18 |
| 3,206,749 | 9/1965 | Chatelain | 343—18 |

RODNEY D. BENNETT, *Primary Examiner.*

B. L. RIBANDO, *Assistant Examiner.*